Oct. 20, 1942.  G. D. DILL  2,299,130
LIQUID AND GAS CONTACT APPARATUS
Filed June 7, 1940
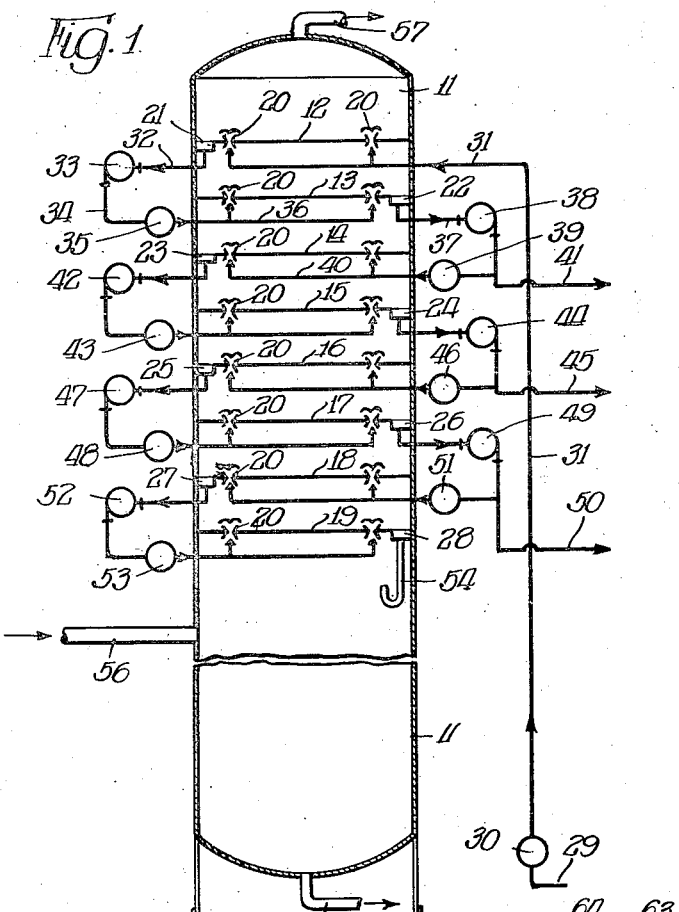
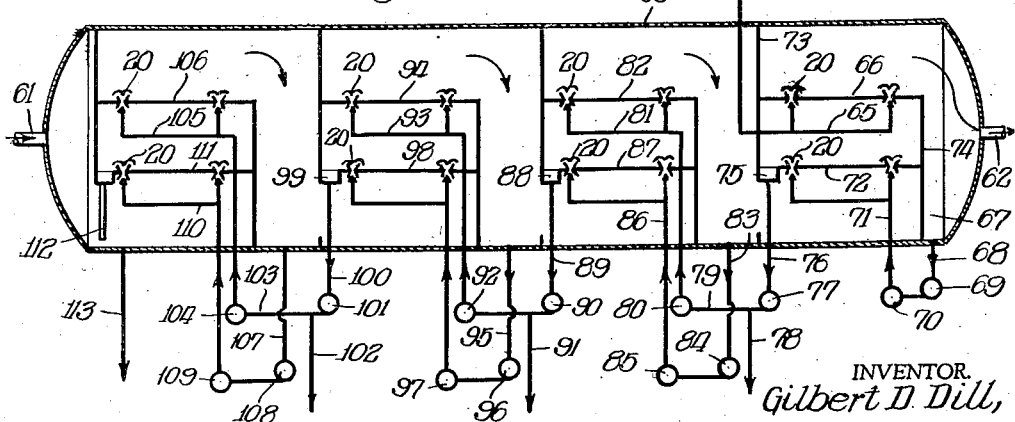
INVENTOR.
Gilbert D. Dill,
BY Patented Oct. 20, 1942

2,299,130

UNITED STATES PATENT OFFICE 2,299,130

LIQUID AND GAS CONTACT APPARATUS

Gilbert D. Dill, New York, N. Y., assignor to H. A. Brassert & Company, Chicago, Ill., a corporation of Illinois Application June 7, 1940, Serial No. 339,289

5 Claims. (Cl. 261—76)

This invention relates to a new and improved liquid and gas contact apparatus and more particularly to apparatus of this character in which temperatures may be adequately controlled and intimate contact and mixture of the gases and liquids secured.

In the preferred form of construction, contact units are used of the type disclosed in my prior Patent No. 2,088,691, but it will be understood that any generally similar types of contact units may be used if desired. The apparatus provides means for use in various types of processes for the absorption, fractionation, cooling or heating or other treatment of gases by means of liquids. The temperatures of the liquids may be accurately controlled at different stages of the process which involves repeated contacts between gas and liquid in a plurality of stages. The flow of liquid in each stage is concurrent with the flow of gas while the overall flow of liquids is countercurrent to the gas flow.

It is an object of the present invention to provide apparatus for producing intimate contact between gases and liquids.

It is a further object to provide apparatus of this character having a plurality of contact stages with separate control of liquid temperature.

It is an additional object to provide a construction in which the flow of gas and liquid in individual stages is concurrent while the overall flow of liquid is countercurrent to the gas or vapor flow.

It is also an object to provide a construction in which the gas or vapor is aspirated through in contact with the liquid without substantial loss in gas or vapor pressure.

It is another object to provide apparatus in which the relative ratios between gas or vapor and liquid may be readily changed to adapt the apparatus for use in connection with various processes.

It is a further object to provide a construction in which the liquid is pumped from stage to stage and in which any desired portions of the liquid may be diverted or drawn off from the apparatus at various points.

It is also an object to provide an apparatus which may be constructed horizontally or vertically as may be desired.

Other and further objects will appear as the description proceeds.

I have shown certain preferred embodiments of my invention in the accompanying drawing, in which—

Figure 1 is a cross-section of a vertical form of apparatus; and

Figure 2 is a similar section of a horizontal form of apparatus.

Referring first to the construction of Figure 1, the tower 11 is vertical tower of the conventional type used as a fractionating or contact column. This tower is provided with a plurality of transverse decks or partitions 12 to 19, inclusive. These decks are each provided with a plurality of openings through which extend the gas and liquid contacting means 20 of my prior patent above referred to. These decks 12 to 19, inclusive, are each provided with a sump, numbered from 21 to 28, inclusive. The input liquid main 29 leads to the pump 30 which forces the liquid under pressure through the header 31 to the units 20 in deck 12.

The offtake pipe 32 leads from the sump 21 in deck 12 to a pump 33, and the discharge pipe 34 of this pump passes the liquid to the heat exchanger unit 35. From the unit 35 the header 36 discharges to the units 20 in deck 13. The offtake pipe 37 leads from the sump 22 in deck 13 to pump 38. The discharge from pump 38 is to a heat exchanger 39 leading to the header 40 connected to units 20 in deck 14. The discharge from the pump 38 is also connected to an offtake pipe 41 by means of which a portion of the liquid may be drawn off in a side stream.

The remainder of the tower is connected in the same manner, the liquid from sump 23 in deck 14 passing through pump 42 and heat exchanger 43 to the units 20 in deck 15. The pump 44 handles the liquid flowing from sump 24 and passes it to a side discharge pipe 45 or to the heat exchanger 46, from which it flows through the units 20 in deck 16. Pump 47 handles the liquid from sump 25 and passes it through heat exchanger 48 to the units 20 in deck 17. The sump 26 in deck 17 is connected to pump 49 which discharges to the side stream pipe 50 and to the heat exchanger 51. The heat exchanger 51 is connected to units 20 in deck 18. The sump 27 in deck 18 is connected to pump 52, which feeds the liquid through heat exchanger 53 to the units 20 in deck 19. The sump 28 in lower deck 19 is connected to a U-shaped liquid seal pipe 54, the overflow dropping to the bottom of the tower 11 from which it may be drawn off through pipe 55. The gases or vapors to be treated by or mixed with the liquid are introduced into the lower portion of the tower through pipe 56 and pass off from the top of the tower through pipe 57.

The form of construction shown in Figure 2 is generally similar in construction and operation to that above described. This horizontal construction has many desirable features and may be found preferable to the vertical construction for the reason that it is less expensive to construct than the very high vertical tower, and also may be designed so as to be more readily serviced.

In the construction of Figure 2 the horizontal housing 60 is provided with the gas or vapor intake pipe 61 at the left end and the discharge pipe 62 at the right end. The liquid from main 63 passes through pump 64 to the header 65, discharging into the units 20 in the horizontal deck 66. Liquid overflow from deck 66 passes to the lower right end of the chamber at 67, from which it is drawn off through pipe 68 to pump 69. The discharge from pump 69 is through the heat exchanger 70 and pipe 71 to the units 20 in deck 72. Decks 66 and 72 have their left ends connected by vertical wall 73 extending to the top of the housing 60. The right ends of the decks 66 and 72 are connected by vertical wall 74 which extends to the bottom of the housing 60.

The sump 75 in deck 72 is connected by pipe 76 to the pump 77 from which lead the side stream pipe 78 and the pipe 79 which connects to the heat exchanger 80. The heat exchanger 80 is connected by pipe 81 to the units 20 in deck 82. The overflow from deck 82 passes into the bottom of the housing of chamber 60 and is drawn off through pipe 83 by pump 84 which discharges through heat exchanger 85 and pipe 86 to units 20 in deck 87. The sump 88 in deck 87 passes the liquid from that deck to the pipe 89 connected to pump 90. This pump 90 is connected to the side stream pipe 91 and the heat exchanger 92. This heat exchanger 92 is connected by pipe 93 with the contact units 20 in deck 94. The overflow from deck 94 is drawn off through pipe 95 by pump 96 and discharged through heat exchanger 97 to units 20 in deck 98.

The final stages in the entire unit are connected in the same manner, the sump 99 handling the liquid from deck 98, this liquid passing through pipe 100 to pump 101. This pump 101 discharges into the offtake pipe 102 and through pipe 103 to the heat exchanger 104. The heat exchanger 104 is connected through pipe 105 to units 20 in deck 106. The liquid flowing from deck 106 is drawn off by pipe 107 and passed by pump 108 to heat exchanger 109 from which it is discharged through pipe 110 to units 20 in deck 111. The overflow from deck 111 passes to the lower portion of the chamber below that deck through pipe 112, and is drawn off from the entire unit through pipe 113. The decks in succeeding stages are mounted on vertical walls in the same manner as described in connection with decks 66 and 72, these vertical walls separating the entire contact unit into a plurality of chambers which communicate only through the contact units 20 extending through the decks separating the chambers.

In operation of either form of apparatus, it will be apparent that while the general flow of liquid is countercurrent to the flow of the gases or vapors being treated in the unit, the flow in each stage is concurrent with the vapor flow. Referring to the construction of Figure 1, the vapor or gas flow is upwardly through the tower and the flow of liquid in each contact unit 20 is also upwardly. The body of liquid used for contact purposes, however, is introduced through units 20 in the uppermost deck 12 and the overflow from that deck is carried downwardly to be again placed under pressure and forced through the units 20 in deck 13. This flow progresses in the same manner throughout the vertical tower. While a plurality of side cut or intermediate offtake pipes 41, 45 and 50 have been shown, it will be understood that a greater or less number of side cuts may be taken. It is also possible through such pipes to add liquid to the lower stages if that should prove desirable in certain uses of the apparatus.

The operation of the horizontal construction is simullar to that of the vertical. Here the main body of liquid is introduced in the right hand end of the entire contact apparatus housing 60 and ultimately reaches the left end to pass out through pipe 113, unless it is partially withdrawn through the intermediate offtakes 78, 91 and 102. The flow of gases or vapors, however, is in the opposite direction and this vapor flows progressively upwardly through to decks 111 and 106, after which it flows downwardly to again come upwardly under and through deck 98, after which it passes through deck 94 and again passes downwardly under deck 87. The flow continues in a similar manner through the remaining decks to the offtake passage 62.

It will be understood that in both forms of construction the liquid passing upwardly from the nozzles through the Venturi-like throat of the units 20, impinges against the deflector which is supported above the Venturi throat of each such unit. This deflector stops the upward flow of the liquid and turns it and deflects it to flow downwardly upon the deck adjacent the upper walls of the throat. The unit itself is fully disclosed in my prior patent and need not be further described herein.

Due to the concurrent flow of liquid and gases or vapors through these units, there is substantially no pressure loss in the gas or vapor. The series of pumps supply pressure to the liquids so that the gases or vapors are aspirated through the units 20 without effective loss of pressure. The heat exchangers may be for the purpose of raising or lowering the temperatures of the liquid flows at different points in operation, depending upon the nature of the process being carried out by the use of the apparatus. It will be understood that a greater or less number of decks and of units may be used and that the structures will be proportioned according to the purpose for which they are used and according to the ratios of gases and vapors which are passed through the units. While I have shown certain preferred forms of apparatus, they are to be understood to be by way of example only, as the construction may be varied within the spirit and scope of the appended claims. It is further to be understood that the term "gases" when used herein is intended to include any gases including air or any gaseous vapors with or without entrained solids or liquids in finely divided form.

What is claimed is:

1. Apparatus for providing intimate contact between liquids and gases, comprising a series of chambers separated by walls having openings therein, nozzles directed through each of said openings, means for introducing gas to one end of said series of chambers, means for withdrawing gas from the opposite end of the series, means for supplying liquid under pressure to said nozzles to form aspirating sprays through said openings, and means for withdrawing the liquid from certain of said chambers, for placing the withdrawn liquid under pressure and returning it to the nozzles spraying into an adjacent chamber.

2. Apparatus for providing intimate contact between liquids and gases, comprising a series of chambers separated by walls having openings therein, nozzles directed through each of said openings, means for introducing gas to one end of said series of chambers, means for withdrawing gas from the opposite end of the series, means for supplying liquid under pressure to said nozzles to form aspirating sprays through said openings, and means for withdrawing the liquid from certain of said chambers for changing the temperature of said liquid and for placing the withdrawn liquid under pressure and returning it to the nozzles spraying into an adjacent chamber.

3. Apparatus for providing intimate contact between liquids and gases, comprising a series of chambers, approximately horizontal walls separating the chambers, openings through said walls, spray nozzles directed through each of said openings, means for supplying liquid to said nozzles, means for withdrawing liquid from one chamber and for returning at least a portion of said liquid under pressure to the nozzles discharging into an adjacent chamber, and means for introducing gas to be treated to one end of said series of chambers and for withdrawing it from the opposite end of the series, the gas flowing in the same direction as the flow from the nozzles.

4. Apparatus for providing intimate contact between liquids and gases comprising a series of chambers, approximately horizontal walls separating the chambers, openings through said walls, spray nozzles directed through said openings, means for supplying liquid to said nozzles, means for withdrawing liquid from one chamber and for changing the temperature of at least a portion of the liquid and returning said portion under pressure to the nozzles discharging into an adjacent chamber, and means for introducing gas to be treated to one end of said series of chambers and for withdrawing it from the opposite end of the series, the gas flowing in the same direction as the flow from the nozzles.

5. Apparatus for providing intimate contact between liquids and gases, comprising a series of chambers, approximately horizontal walls separating the chambers, openings through said walls, spray nozzles directed through said openings, means for supplying liquid to said nozzles, means for withdrawing liquid from one chamber and for returning at least a portion of said liquid under pressure to the nozzles discharging into an adjacent chamber, and means for introducing gas to be treated to one end of said series of chambers and for withdrawing it from the opposite end of the series, the gas flowing in the same direction as the flow from the nozzles, and the progressive transfer of liquid from one chamber to another being countercurrent to the gas flow through the apparatus.

GILBERT D. DILL.